May 21, 1935. S. SERA ET AL 2,002,299
AIRPLANE
Filed Jan. 2, 1935
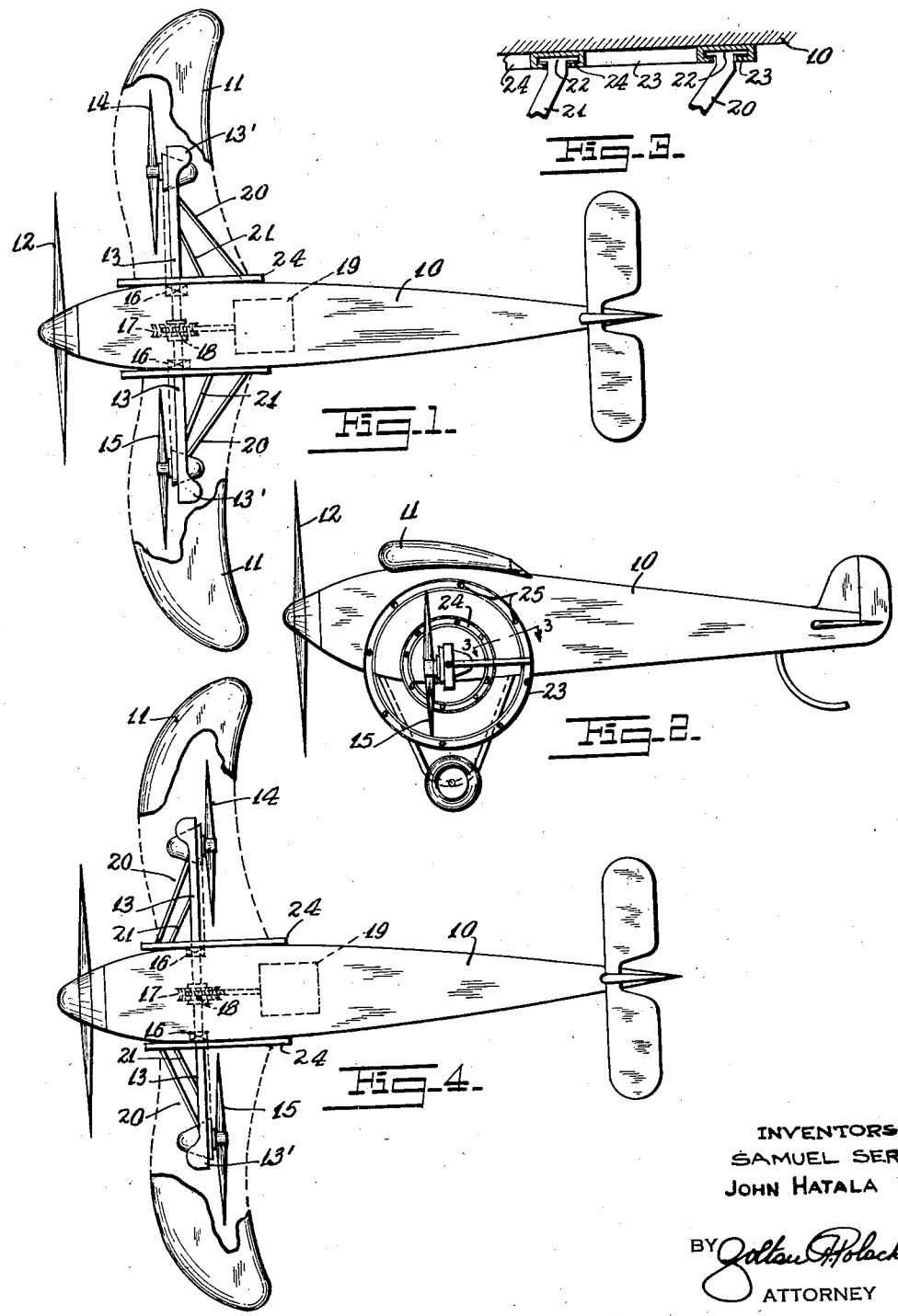
INVENTORS
SAMUEL SERA
JOHN HATALA
BY
ATTORNEY Patented May 21, 1935

2,002,299

UNITED STATES PATENT OFFICE 2,002,299

AIRPLANE

Samuel Sera and John Hatala, Erie, Pa.

Application January 2, 1935, Serial No. 6

6 Claims. (Cl. 244—25)

The invention relates to new and useful improvements in airplanes.

The invention has for an object the construction of an airplane which is characterized by the provision of a body with wings at the sides set back from the front, a motor driven propeller on the front of the body, and a transverse shaft through the sides of the body beneath the wings and equipped at the ends with motor driven propellers.

Still further, the invention contemplates an arrangement whereby the auxiliary side propellers may be directed towards the back.

Still further, the invention also contemplates the construction of a device as mentioned which furthermore proposes the arrangement of struts reinforcing the transverse shaft and having their ends adjustably engaged in guides to properly support the shaft and motor driven propellers.

As another object the invention proposes the construction of a device as mentioned which is simple and durable, and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a plan view of an airplane constructed according to this invention, portions of the wings being broken away to disclose interior parts.

Fig. 2 is a side elevational view of Fig. 1.

Fig. 3 is a fragmentary enlarged sectional view taken on the line 3—3 of Fig. 2.

Fig. 4 is a view similar to Fig. 1 but illustrating the auxiliary propellers directed rearwards.

The improved airplane, according to this invention, includes an airplane body 10 with wings 11 at the sides set back from the front. A motor driven propeller 12 is arranged upon the front of the body in conventional fashion. A transverse shaft 13 is engaged through the sides of the body, beneath the wings 11 and at the ends is equipped with motor driven propellers 14 and 15. The shaft 13 is rotatively mounted in bearings 16 mounted upon the body 10. These bearings are arranged at the sides of the body. The shaft 13 extends past the bearings 16 and at the ends terminates in enlarged portions 13' in which the motors of the motor driven propellers 14 and 15 are mounted.

A means is provided for turning the shaft 13. This means comprises a worm wheel 17 mounted on the shaft 13 and meshing with a worm pinion 18 upon the shaft of a prime mover, such as the motor 19. The ends of the shaft 13 are reinforced with struts 20 and 21 extending diametrically opposite to the propellers 14 and 15 and having their ends rigidly but adjustably mounted. More particularly, the ends of the struts are formed with heads 22 working in grooves formed in annular members 23 and 24. These annular members are arranged concentrically. The struts 20 and 21 are of different size as clearly illustrated in Fig. 1, so that the shaft 13 is supported at different areas. The annular members 23 and 24 are merely attached upon the sides of the airplane body 10 with screws 25.

The operation of the device may be understood by first considering the condition it is shown to be in, in Fig. 1. The auxiliary propellers 14 and 15 may be directed rearwards by merely operating the motor 19. Rotations from the motor are transmitted to rotate the shaft 13 so as to turn the motor driven propellers in the desired direction. A feature of the invention is the fact that as the shaft 13 turns, the struts 20 and 21 will be moved along with the shaft since they are rigidly connected therewith and in all positions of turning serve to reinforce the shaft 13 against possible bending due to the operation of the propellers.

A further feature of the invention is the arrangement of the ends of the struts wherein they are slidably supported and automatically seek new positions as the shaft 13 is turned.

While we have illustrated and described the preferred embodiment of our invention, it is to be understood that we do not limit ourselves to the precise construction herein disclosed and the right is reserved to all changes and modifications coming within the scope of the invention as defined in the appended claims.

Having thus described our invention, what we claim as new, and desire to secure by United States Letters Patent is:—

1. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves.

2. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves, said transverse shaft being mounted in a pair of bearings arranged at the sides of the body.

3. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves, said means for turning said shaft comprising a worm wheel upon the shaft meshing with a worm pinion mounted upon the drive shaft of a prime mover.

4. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves, said grooved rings being concentric.

5. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves, the ends of said struts having heads engaged in the grooves of said rings.

6. In an improved airplane, a body with wings at the sides set back from the front, a motor driven propeller on the front of said body, a transverse shaft through the sides of the body and beneath said wings, motor driven propellers mounted upon the ends of said transverse shaft, means for turning said shaft for changing the direction of the propellers, grooved rings attached upon the sides of said body, and reinforcement struts rigidly connected with said shaft and slidably supported in said grooves, the ends of said struts having heads engaged in the grooves of said rings, said struts being arranged at different positions along the shaft, and said rings being concentric and adapted to receive the ends of said struts.

SAMUEL SERA.
JOHN HATALA.